United States Patent
Oyama et al.

(10) Patent No.: US 7,394,673 B2
(45) Date of Patent: Jul. 1, 2008

(54) SWITCHING POWER SUPPLY APPARATUS PROVIDED WITH SERIES-CONNECTED CHARGE PUMP CIRCUITS

(75) Inventors: Manabu Oyama, Kyoto (JP); Daisuke Uchimoto, Kyoto (JP)

(73) Assignee: Rohm Co., Ltd. (JP)

( * ) Notice: Subject to any disclaimer, the term of this patent is extended or adjusted under 35 U.S.C. 154(b) by 1 day.

(21) Appl. No.: 11/513,544

(22) Filed: Aug. 31, 2006

(65) Prior Publication Data

US 2007/0091655 A1    Apr. 26, 2007

(30) Foreign Application Priority Data

Sep. 6, 2005    (JP)    ............... 2005-257398

(51) Int. Cl.
*H02M 3/18*    (2006.01)
*G05F 1/59*    (2006.01)

(52) U.S. Cl. ......................... 363/59; 327/536
(58) Field of Classification Search ............ 363/59, 363/60; 327/536; 307/110
See application file for complete search history.

(56) References Cited

U.S. PATENT DOCUMENTS

| 6,525,949 B1* | 2/2003 | Johnson et al. | 363/60 |
| 7,009,445 B2* | 3/2006 | Ishii | 327/535 |
| 7,221,573 B2* | 5/2007 | Kwean | 363/59 |

FOREIGN PATENT DOCUMENTS

JP    2001-258241    9/2001

* cited by examiner

*Primary Examiner*—Gary L Laxton
(74) *Attorney, Agent, or Firm*—Cantor Colburn LLP

(57) ABSTRACT

A first charge pump circuit converts an input voltage (Vin) into a predetermined voltage, to be outputted as a first output voltage (Vout1). A second charge pump circuit converts the first output voltage (Vout1), outputted from the first charge pump circuit, into a predetermined voltage, to be outputted as a second output voltage (Vout2). A control circuit controls charge-discharge states of the first charge pump circuit and the second charge pump circuit. The control circuit synchronously controls a state in which a first output capacitor of the first charge pump circuit is charged, and a state in which a second flying capacitor of the second charge pump circuit is charged.

6 Claims, 4 Drawing Sheets

SWITCHING POWER SUPPLY APPARATUS PROVIDED WITH SERIES-CONNECTED CHARGE PUMP CIRCUITS

BACKGROUND OF THE INVENTION

1. Field of the Invention

The present invention relates to a switching power supply apparatus.

2. Description of the Related Art

In recent years, among small sized information terminals such as mobile telephones, PDAs (Personal Digital Assistants) and the like, there are devices in which a voltage is required that is higher than an output voltage of a battery, as in, for example, an LED (LightEmittingDiode) used as a backlight for liquid crystal or the like. For example, in many of these small sized information terminals, Li-ion batteries are used; the output voltage thereof is normally about 3.5 V, and about 4.2 V when fully charged, but the LED requires, as a drive voltage thereof, a voltage higher than the battery voltage. In cases in which a voltage higher than the battery voltage is required, the battery voltage is stepped up using a voltage boost circuit such as a switched capacitor system or the like, and the voltage required to drive a load circuit, such as the LED or the like, is obtained. In addition, there are cases in which a negative power supply is necessary in these types of small sized information terminals; in these cases also, a desired negative voltage is obtained using a voltage inverting circuit of a switched capacitor system (Patent Document 1).

Here, a case is considered in which, for some small sized information terminal, a load circuit in which a voltage is necessary that is higher than the battery voltage, and a load circuit in which a negative voltage is necessary, are driven at the same time. In order to supply a suitable voltage to the load circuits that have to be driven with different voltages in this way, a method may be considered in which a plurality of charge pump circuits are connected in series, and output of each of the charge pump circuits is supplied to the respective loads. For example, in cases in which a charge pump circuit that has a charge-pump ratio of two, and a voltage inverting type charge pump circuit are connected in a two step series, if the battery voltage is written as Vbat, it is possible to supply three different voltages, Vbat, 2×Vbat, and −2×Vbat, to the loads.

Patent Document 1: Japanese Patent Application Laid Open No. 2001-258241

In general, a charge pump circuit is provided with a flying capacitor, an output capacitor, and a plurality of switch elements connecting these two capacitors; by controlling the ON-OFF state of the switch elements, a charge is stored in the flying capacitor and the output capacitor, and input voltage is converted into a desired voltage.

Here, as described above, cases are considered in which a plurality of charge pump circuits are connected in series. In these cases, the input voltage of the charge pump circuit on a second stage is the output voltage of the charge pump circuit on a first stage, and the flying capacitor of the charge pump circuit on the second stage is charged by a charge stored in the output capacitor of the charge pump circuit of the first stage. Accordingly, in each charge pump circuit, if a charge-discharge state of a capacitor, that is, an ON-OFF state of the switch elements, is distinctly and independently controlled, according to the case, a ripple in the output voltage becomes large.

SUMMARY OF THE INVENTION

The present invention has been made in light of these problems, and a general purpose thereof is to reduce ripple in output voltage in a switching power supply apparatus in which a plurality of charge pump circuits are connected in series.

The switching power supply apparatus in one embodiment of the present invention is provided with a first charge pump circuit for converting input voltage into a predetermined voltage to be outputted as a first output voltage, a second charge pump circuit for converting the first output voltage, outputted from the first charge pump circuit, into a predetermined voltage to be outputted as a second output voltage, and a control circuit for controlling a charge-discharge state of the first and second charge pump circuit. The control circuit synchronously controls a state in which an output capacitor of the first charge pump circuit is charged, and a state in which a flying capacitor of the second charge pump circuit is charged.

According to this embodiment, the flying capacitor of the second charge pump circuit is charged by an electrical charge stored in the output capacitor of the first charge pump circuit. Consequently, by simultaneously implementing a phase in which the flying capacitor of the second charge pump circuit is charged, and a phase in which the output capacitor of the first charge pump circuit is charged, fluctuation in charge amount stored in the output capacitor of the first charge pump circuit is reduced. As a result, ripple in the first output voltage can be reduced.

The second charge pump circuit may be a voltage inverting type charge pump circuit that inverts the first output voltage. Furthermore, the first charge pump circuit may boost (step up) the input voltage at a charge-pump ratio of two.

Another embodiment of the present invention concerns an electronic device. This electronic device is provided with a battery, and the abovementioned switching power supply apparatus for converting voltage of the battery to a predetermined voltage and outputting the voltage According to this embodiment, a stable voltage supply can be given to a plurality of loads installed in the electronic device.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
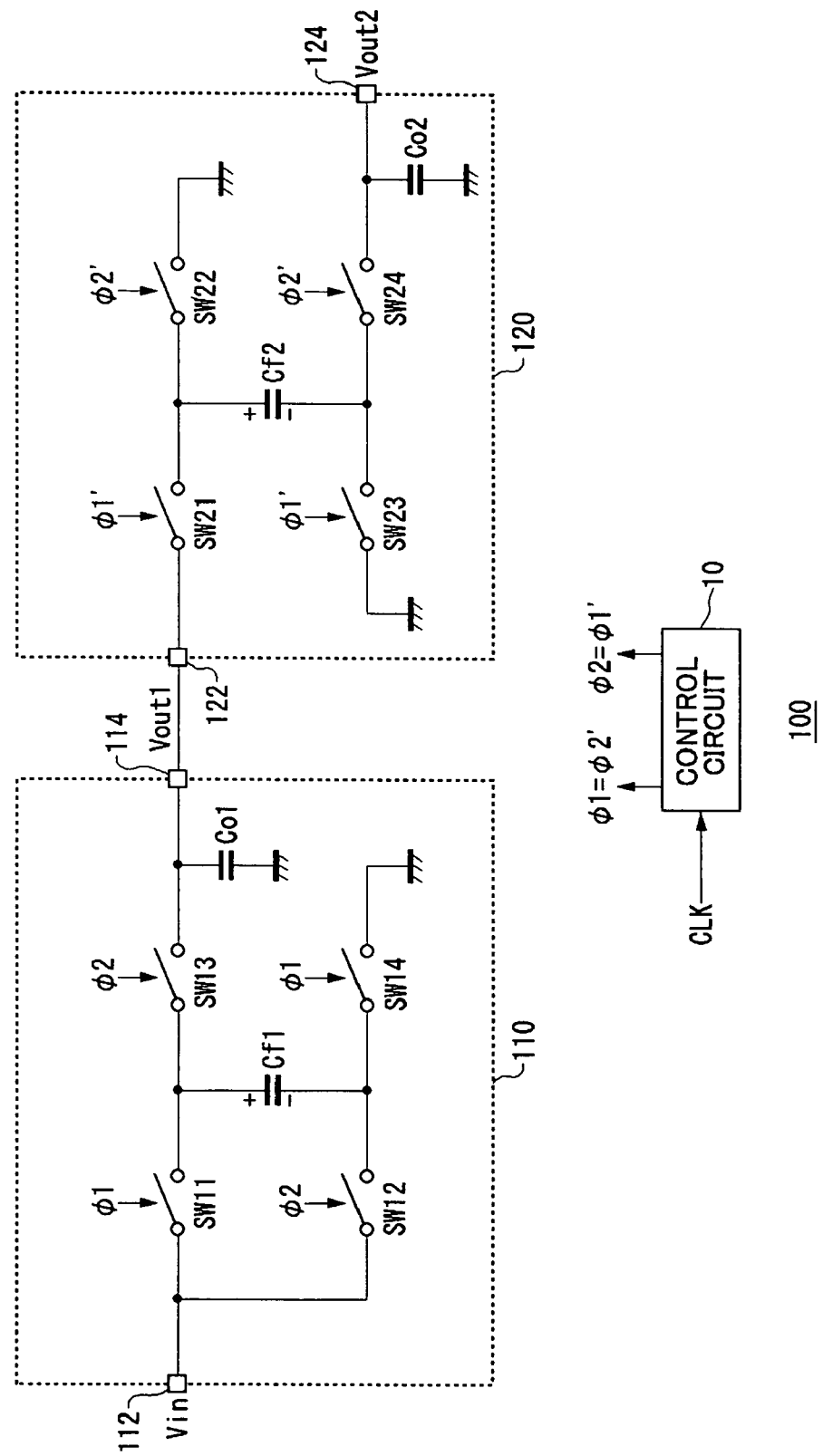
FIG. 1 is a diagram showing a configuration of a switching power supply apparatus according to an embodiment of the present invention.

FIG. 1 shows a configuration of a switching power supply apparatus 100 according to an embodiment of the present invention. The switching power supply apparatus 100 is provided with a first charge pump circuit 110, a second charge pump circuit 120, and a control circuit 10.

The first charge pump circuit 110 converts an input voltage Vin, inputted to a first input terminal 112, into a predetermined voltage, and outputs the predetermined voltage from a first output terminal 114, as a first output voltage Vout1. In the present embodiment, a charge-pump ratio of the first charge pump circuit 110 is two-fold, and a relationship of Vout1=2×Vin is established between the input voltage Vin and the first output voltage Vout1. A power supply voltage, for example, a battery voltage, of an electrical device on which the switching power supply apparatus 100 according to the present embodiment is mounted, is used as the input voltage Vin.

The first charge pump circuit 110 is provided with a first switch SW11, a second switch SW12, a third switch SW13, a fourth switch SW14, a first flying capacitor Cf1, and a first output capacitor Co1.

The first switch SW11 is arranged between the first input terminal 112 and a first terminal (+) of the first flying capacitor Cf1, and the second switch SW12 is arranged between the first input terminal 112 and a second terminal (−) of the first flying capacitor Cf1. Furthermore, the third switch SW13 is arranged between the first output terminal 114 and a first terminal of the first flying capacitor Cf1, and the fourth switch SW14 is arranged between the second terminal of the first flying capacitor Cf1 and an connection. The first output capacitor Co1 is arranged between the first output terminal 114 and a ground terminal.

The first switch SW11 to the fourth switch SW14 are configured of, for example, a MOSFET (Metal Oxide Semiconductor Field Effect Transistor). A gate terminal of each MOSFET of the first switch SW11 to the fourth switch SW14 is connected to the control circuit 10, via wiring not shown in the figure, and their respective ON-OFF states are controlled by a control signal generated by the control circuit 10.

The control circuit 10 controls charge-discharge states of the first charge pump circuit 110, and the second charge pump circuit 120, based on a clock signal CLK inputted from the outside. Specifically, the control circuit 10 alternately repeats a first state φ1 in which the first switch SW11 and the fourth switch SW14 are ON, and the second switch SW12 and the third switch SW13 are OFF, and a second state φ2 in which the first switch SW11 and the fourth switch SW14 are OFF, and the second switch SW12 and the third switch SW13 are ON.

In the first state φ1, where the first switch SW11 and the fourth switch SW14 are ON, the input voltage Vin is applied to the first terminal of the first flying capacitor Cf1, and the second terminal of the first flying capacitor Cf1 is connected to the ground terminal. As a result, in the first state φ1, the first flying capacitor Cf1 is charged by the input voltage Vin.

Next, in the second state φ2, where the second switch SW12 and the third switch SW13 are ON, the second terminal of the first flying capacitor Cf1 is connected to the first input terminal 112, and the first terminal is connected to the first output terminal 114. As a result, the first output capacitor Co1 is charged with a voltage (Vin+Vin=Vin×2) occurring at the first terminal of the first flying capacitor Cf1.

In this way, by alternately repeating the first state φ1 and the second state φ2, the first charge pump circuit 110 outputs the first output voltage Vout1 (=Vin×2) from the first output terminal 114. The first output voltage Vout1 outputted from the first output terminal 114 is supplied to a load not shown in the figures, and is outputted to the second charge pump circuit 120.

The second charge pump circuit 120 converts the first output voltage Vout1, inputted to the second input terminal 122, into a predetermined voltage, and outputs the predetermined voltage from the second output terminal 124 as a second output voltage Vout2. In the present embodiment, a charge-pump ratio of the second charge pump circuit 120 is set at −1 fold, and a relationship of Vout2=−Vout1 is established between the second output voltage Vout2 and the first output voltage Vout1.

The second charge pump circuit 120 is provided with a first switch SW21, a second switch SW22, a third switch SW23, a fourth switch SW24, a second flying capacitor Cf2, and a second output capacitor Co2.

The first switch SW21 is arranged between the second input terminal 122 and a first terminal (+) of the second flying capacitor Cf2, and the second switch SW22 is arranged between a first terminal of the second flying capacitor Cf2 and the ground terminal. Furthermore, the third switch SW23 is arranged between a second terminal (−) of the second flying capacitor Cf2 and the ground terminal, and the fourth switch SW24 is arranged between a second terminal of the second flying capacitor Cf2 and a second output terminal 124. The second output capacitor Co2 is arranged between the second output terminal 124 and the ground terminal.

The control circuit 10 alternately repeats a first state φ1' in which the first switch SW21 and the third switch SW23 are ON, and the second switch SW22 and the fourth switch SW24 are OFF, and a second state φ2' in which the first switch SW21 and the third switch SW23 are OFF, and the second switch SW22 and the fourth switch SW24 are ON.

In the first state φ1', where the first switch SW21 and the third switch SW23 are ON, the first output voltage Vout1 is applied to the first terminal of the second flying capacitor Cf2, and the second terminal of the second flying capacitor Cf2 is connected to the ground terminal. As a result, in the first state φ1', the second flying capacitor Cf2 is charged by the first output voltage Vout1.

Next, in the second state φ2', where the second switch SW22 and the fourth switch SW24 are ON, the first terminal of the second flying capacitor Cf2 is connected to the ground terminal, and the second terminal is connected to the second output terminal 124. As a result, the second output capacitor Co2 is charged by a voltage −Vout1 occurring at the second terminal of the second flying capacitor Cf2.

In this way, by alternately repeating the first state φ1' and the second state φ2', the second charge pump circuit 120 outputs the second output voltage Vout2 (=−Vout1) from the second output terminal 124. The second output voltage Vout2 outputted from the second output terminal 124 is supplied to a load not shown in the figures.

Moreover, in the present embodiment, the control circuit 10, the first switch SW11 to the fourth switch SW14 of the first charge pump circuit 110, and the first switch SW21 to the fourth switch SW24 of the second charge pump circuit 120 are configured as a function IC integrated on one semiconductor board. In addition, the first flying capacitor Cf1, the second flying capacitor Cf2, the first output capacitor Co1, and the second output capacitor Co2 are connected as chip parts, outside the IC.

In the switching power supply apparatus 100 of the present embodiment, the control circuit 10 performs synchronous ON-OFF control of the first charge pump circuit 110 and the second charge pump circuit 120. Below, explanations are given concerning the first state φ1 and the second state φ2 of the first charge pump circuit 110, and the first state φ1' and the second state φ2' of the second charge pump circuit 120.

The control circuit 10 associates the first state φ1 of the first charge pump circuit 110 and the second state φ2' of the second charge pump circuit 120, and associates the second state φ2 of the first charge pump circuit 110 and the first state φ1' of the second charge pump circuit 120, and controls charge-discharge states of each capacitor. That is, in the present embodiment, relationships φ1=φ2', and φ2=φ1' are established.

As a result, the first state φ1 in which the first output capacitor Co1 of the first charge pump circuit 110 is charged, and the second state φ2' in which the second flying capacitor Cf2 of the second charge pump circuit 120 is charged, occur at the same time. In addition, the second state φ2 in which the first flying capacitor Cf1 is charged, and the first state φ1' in which the second output capacitor Co2 is charged, occur at the same time.

Figure 2:
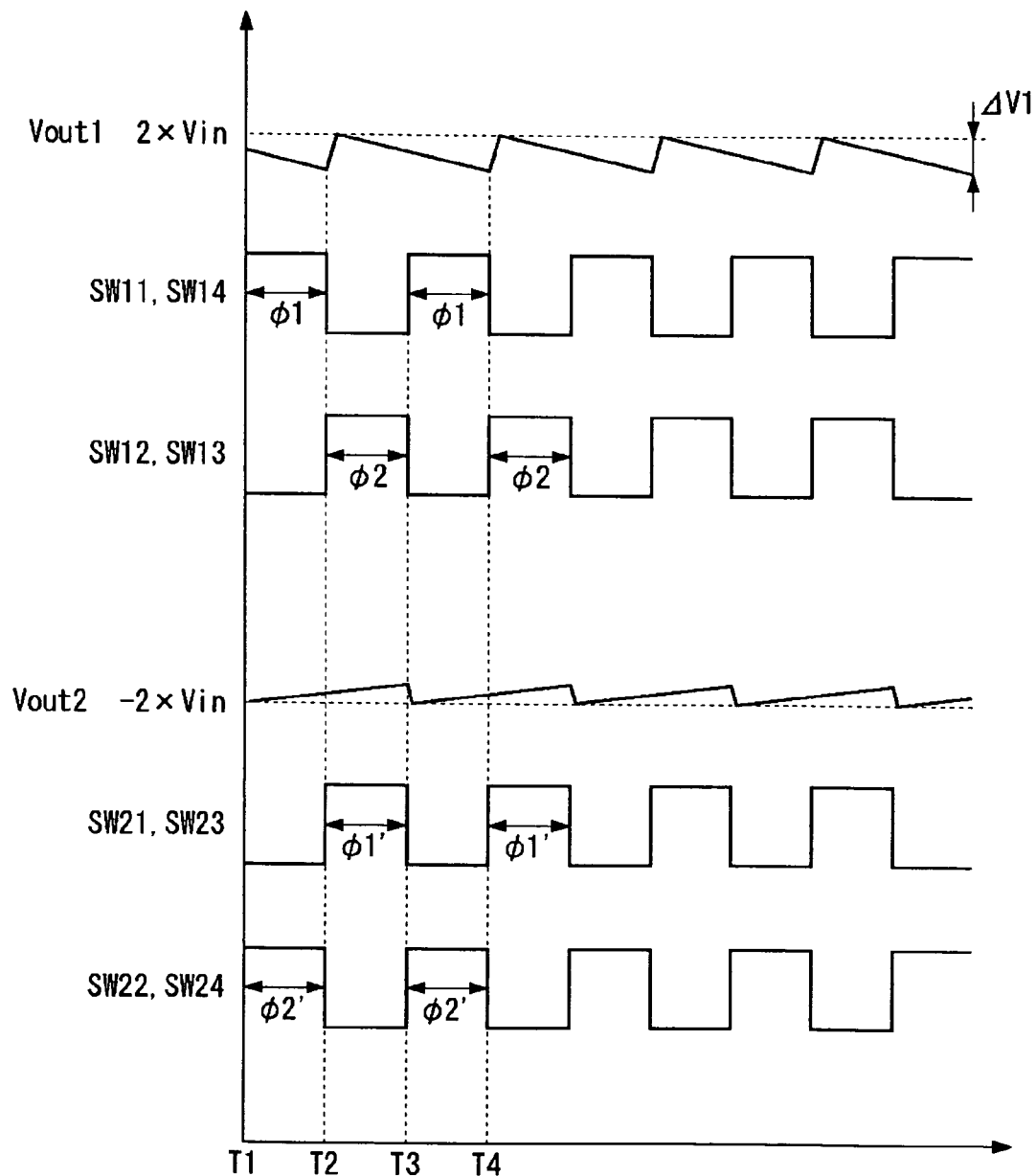
FIG. 2 is a time chart showing an operation state of the switching power supply apparatus of FIG. 1.

FIG. 2 is a time chart showing an operation state of the switching power supply apparatus 100 according to the present embodiment. In FIG. 2, the first switch SW11 to the fourth switch SW14 of the first charge pump circuit 110, and the first switch SW21 to the fourth switch SW24 of the second charge pump circuit 120, exhibit ON and OFF states, respectively, corresponding to an ON state at a high level, and an OFF state at a low level. Furthermore, to provide a concise explanation, the vertical axis and horizontal axis of the figure are suitably enlarged or contracted.

At time T1, in the first charge pump circuit 110, the first switch SW11 and the fourth switch SW14 are ON, and the first flying capacitor Cf1 is charged with the input voltage Vin.

Next, at time T2, the second switch SW12 12 and the third switch SW13 are ON, and the charge stored in the first flying capacitor Cf1 is transferred to the first output capacitor Co1, and the first output voltage Vout1 rises to close to 2×Vin. At this time, if the second charge pump circuit 120 is focused on, at time T2 the first switch SW21 and the third switch SW23 are ON, and the first state φ1' exists, in which the second flying capacitor Cf2 is charged. At this time, the first output capacitor Co1 and the second flying capacitor Cf2 are connected in parallel between the first flying capacitor Cf1 and a connection to the ground terminal. Accordingly, at time T2, the charge stored in the first flying capacitor Cf1 is transferred to the first output capacitor Co1, and is also transferred to the second flying capacitor Cf2. As a result, the second flying capacitor Cf2 is charged with the first output voltage Vout1 (=2×Vin).

During the period from time T2 to time T4, by a current flowing in a load connected to the first output terminal 114, charge stored in the first output capacitor Co1 is discharged, and the first output voltage Vout1 gradually decreases with time.

At time T3, in the first charge pump circuit 110, the first switch SW11 and the fourth switch SW14 are ON, and the first flying capacitor Cf1 is charged with the input voltage Vin. On the other hand, in the second charge pump circuit 120, if the second switch SW22 and the fourth switch SW24 are ON, charge stored in the second flying capacitor Cf2 is transferred to the second output capacitor Co2. At this time, the second output voltage Vout2 decreases to −Vout1 (=−2×Vin). Thereafter, by current flowing in a load connected to the second output terminal 124, the charge stored in the second output capacitor Co2 decreases, and the second output voltage Vout2 gradually increases.

By repeatedly performing the abovementioned switching operation, the switching power supply apparatus 100 of the present embodiment outputs the first output voltage Vout1 (=2×Vin) from the first output terminal, and the second output voltage Vout2 (=−Vout1=−2×Vin) from the second output terminal 124.

According to the switching power supply apparatus 100 of the present embodiment, by performing, at the same time, a phase in which the second flying capacitor Cf2 of the second charge pump circuit 120 is charged, and a phase in which the first output capacitor Co1 of the first charge pump circuit 110 is charged, fluctuations in charge amount stored in the first output capacitor Co1 of the first charge pump circuit 110 can be reduced and a fluctuation amount ΔV1 of the first output voltage Vout1 can be reduced. In addition, the second output voltage Vout2 of the second charge pump circuit 120 can be made to approach a voltage that is the inverse of the first output voltage, that is −Vout1 =−2×Vin.

Figure 3:
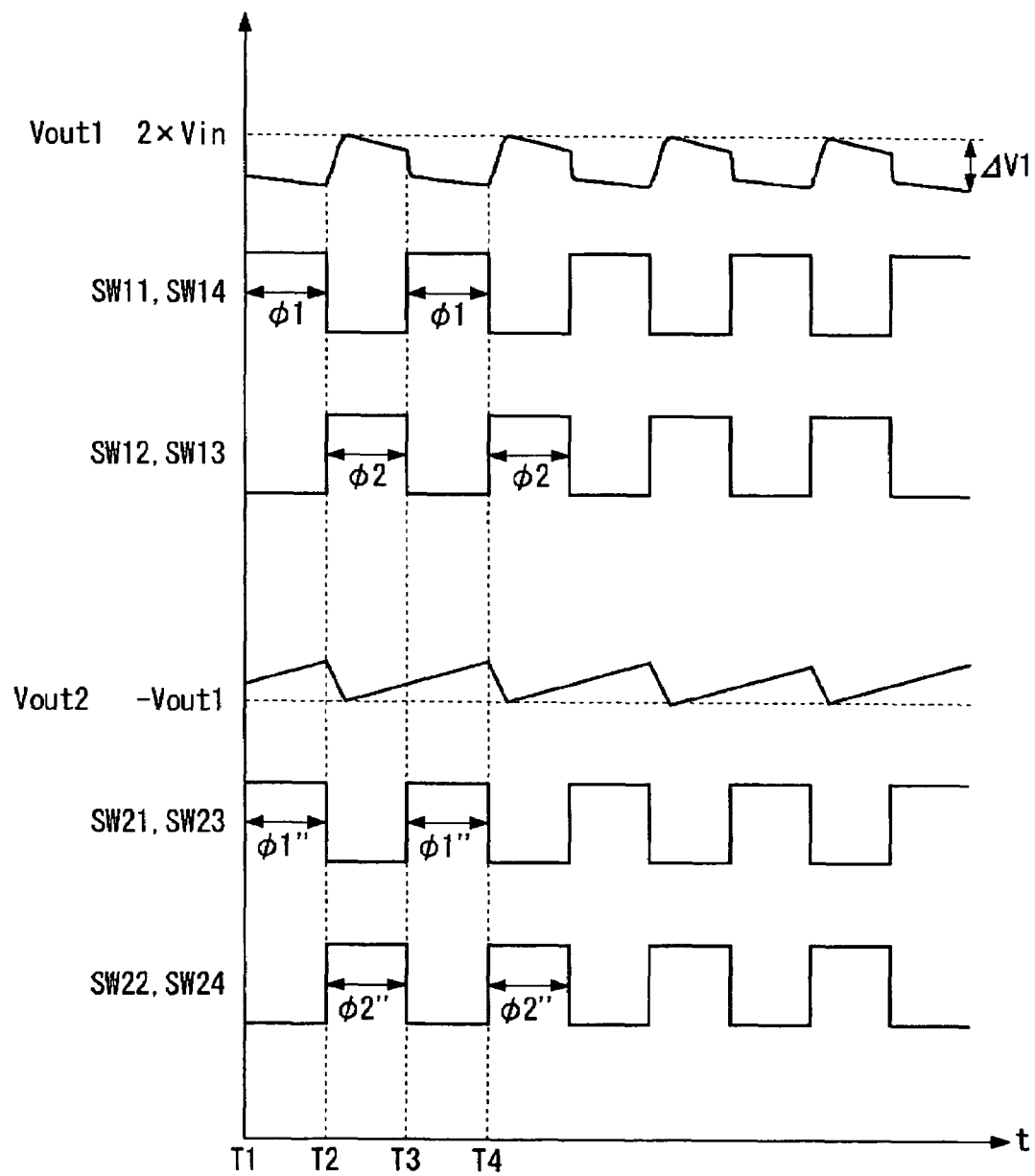
FIG. 3 is a time chart of a switching operation of a first charge pump circuit and a second charge pump circuit, when set with a phase that is reverse of the present embodiment.

Effects of the switching power supply apparatus 100 according to the present embodiment are further clarified by comparison with FIG. 3. FIG. 3 is a time chart when a switching operation of the first charge pump circuit. 110 and the second charge pump circuit 120 is set with a phase the reverse of the present embodiment.

As shown in FIG. 3, at time T1, the first switch SW11 and the fourth switch SW14 are ON, and the first flying capacitor Cf1 is charged. Thereafter, at time T2, the second switch SW12 and the third switch SW13 are ON, and by the charge stored in the first flying capacitor Cf1 being transferred, the first output capacitor Co1 is charged. As a result, the first output voltage Vout1 rises to close to Vout1=2×Vin.

Thereafter, in a period from time T2 to time T3, by a current flowing in a load connected to the first output terminal 114, the first output voltage Vout1 gradually decreases.

At time T3, in the second charge pump circuit 120, the first switch SW21 and the third switch SW23 are ON, and the second flying capacitor Cf2 is charged by the first output voltage Vout1. At this time, since the charge stored in the first output capacitor Co1 is transferred to the second flying capacitor Cf2, the first output voltage Vout1 decreases.

Thereafter, at time T4, in the second charge pump circuit 120, the second switch SW22 and the fourth switch SW24 are ON, and the charge stored in the second flying capacitor Cf2 is transferred to the second output capacitor Co2, and the second output voltage Vout2 decreases to close to −Vout1. Thereafter, by current flowing in a load connected to the second output terminal 124, the charge stored in the second output capacitor Co2 decreases, and the second output voltage Vout2 gradually increases.

As shown in FIG. 3, in cases in which switching operations of the first charge pump circuit 110 and the second charge pump circuit 120 are controlled in a reversed phase to the switching power supply apparatus 100 according to the present embodiment shown in FIG. 2, at time T3, when the charge stored in the first output capacitor Co1 is transferred to the second flying capacitor Cf2, the first output voltage Vout1 decreases, and a fluctuation amount ΔV1 becomes large. In contrast to this, in cases of the switching power supply apparatus 100 according to the present embodiment shown in FIG. 2, since charging of the first output capacitor Co1 and the second flying capacitor Cf2 is carried out at the same time, by the charge stored in the first flying capacitor Cf1, the fluctuation amount ΔV1 of the first output voltage Vout1 can be curtailed.

Figure 4:
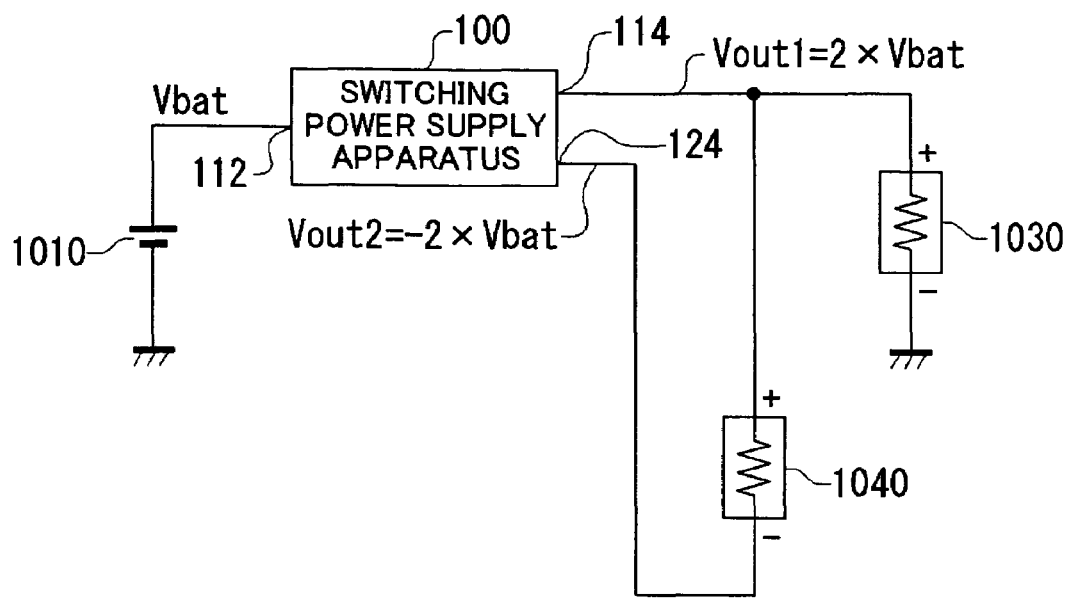
FIG. 4 is a block diagram showing a configuration of an electronic device in which the switching power supply apparatus of FIG. 1 is installed.

The switching power supply apparatus according to the embodiment explained above may be preferably used in a battery driven type of electronic device such as, for example, a mobile telephone or a PDA. FIG. 4 is a block diagram showing a configuration of an electronic device in which the switching power supply apparatus according to the embodiment is installed. The electronic device 1000 is provided with a battery 1010, a switching power supply apparatus 100, a first load 1030, and a second load 1040. The switching power supply apparatus 100 converts a battery voltage Vbat, outputted from the battery 1010, into a first output voltage Vout1 (=2×Vbat), and a second output voltage Vout2 (−2×Vbat). The first output voltage Vout1 is supplied to the first load 1030, such as a LED, a liquid crystal panel, or the like. Furthermore, the second output voltage Vout2 is supplied to the second load 1040 that requires a charge supply.

As exemplified by the above described embodiment, it will be understood by those skilled in the art that various modified examples are possible with combinations of respective constituent elements and respective processes thereof, and that such modified examples are within the scope of the present invention.

In the embodiment, cases in which the second charge pump circuit 120 is a voltage inverting type were explained, but the present invention is not limited thereto, and the charge pump circuit may have a charge-pump ratio of 1.5 fold, 2 fold, or 4 fold, or the charge pump circuit may have a plurality of charge-pump ratios that can be switched. In the same way, the first charge pump circuit 110 is not limited to a charge-pump ratio of 2 fold, and the charge pump circuit may have a charge-pump ratio of 1.5 fold or 4 fold, or may have a plurality of charge-pump ratios that can be switched.

Elements of which the MOSFET is configured in the embodiment maybe replaced by another transistor such as a bipolar transistor, or by a diode. These selections may be decided in accordance with a semiconductor manufacturing process or cost, or a circuit required for usage.

In the embodiment, all of the elements of which the switching power supply apparatus 100 is configured may be integrated in one unit, or may be configured to be divided among separate integrated circuits, or furthermore, the configuration may be such that some of the members are discrete parts. Which parts are integrated may be decided in accordance with cost, occupied area, application, or the like.

While the preferred embodiments of the present invention have been described using specific terms, such description is for illustrative purposes only, and it is to be understood that changes and variations may be made without departing from the spirit or scope of the appended claims.

What is claimed is:

1. A switching power supply apparatus comprising:
a first charge pump circuit for converting input voltage into a predetermined voltage, to be outputted as a first output voltage;
a second charge pump circuit for converting the first output voltage, outputted from the first charge pump circuit, into a predetermined voltage, to be outputted as a second output voltage; and
a control circuit for controlling a charge-discharge state of the first and second charge pump circuits;
wherein the first charge pump circuit includes a first flying capacitor and a first output capacitor,
the second charge pump circuit includes a second flying capacitor and a second output capacitor; and
wherein the control circuit simultaneously implements a state in which the first output capacitor of the first charge pump circuit is charged and a state in which the second flying capacitor of the second charge pump circuit is charged, or simultaneously implements a state in which the first flying capacitor of the first charge pump circuit is charged and a state in which the second output capacitor of the second charge pump circuit is charged.

2. A switching power supply apparatus according to claim 1, wherein the second charge pump circuit is a voltage inverting type charge pump circuit that inverts the first output voltage.

3. A switching power supply apparatus according to claim 1, wherein the first charge pump circuit boost the input voltage at a charge-pump ratio of two.

4. A switching power supply apparatus according to claim 2, wherein the first charge pump circuit boost the input voltage at a charge-pump ratio of two.

5. An electronic device comprising:
a battery; and
a switching power supply apparatus according to claim 1 in which voltage of the battery is converted into a predetermined voltage and outputted.

6. An electronic device comprising:
a battery; and
a switching power supply apparatus according to claim 2 in which voltage of the battery is converted to a predetermined voltage and outputted.

* * * * *